United States Patent [19]

Den Bleyker

[11] 4,329,109

[45] May 11, 1982

[54] VEHICLE LIFTING ATTACHMENT

[75] Inventor: Joseph R. Den Bleyker, Stevensville, Mich.

[73] Assignee: Clark Equipment Company, Buchanan, Mich.

[21] Appl. No.: 197,056

[22] Filed: Oct. 14, 1980

Related U.S. Application Data

[63] Continuation of Ser. No. 75,859, Sep. 17, 1979, abandoned.

[51] Int. Cl.³ .......................... B60R 27/00; B66C 1/20
[52] U.S. Cl. ..................................... 414/685; 280/756; 280/762; 294/82 AH; 414/914
[58] Field of Search ............ 294/67 R, 67 AA, 67 D, 294/67 DA, 67 DB, 67 E, 74, 78 A, 81 R, 81 SF, 82 AH, 86 R; 280/1, 727, 756, 760, 762, 770; 414/685, 912, 914

[56] References Cited

U.S. PATENT DOCUMENTS

| | | | |
|---|---|---|---|
| 1,649,904 | 11/1927 | Longgood | 294/67 R |
| 1,852,758 | 4/1932 | Schroeder | 294/67 R |
| 2,818,296 | 12/1957 | Brennan et al. | 294/82 AH X |
| 2,915,334 | 12/1959 | Barenyi | 280/762 X |
| 2,987,340 | 6/1961 | Mattera | 294/81 R X |
| 3,021,166 | 2/1962 | Kempel et al. | 294/74 |
| 3,239,237 | 3/1966 | Spencer | 294/67 R X |
| 3,599,813 | 8/1971 | Totz | 280/756 X |
| 3,863,973 | 2/1975 | Ross | 294/82 AH X |
| 3,964,776 | 6/1976 | Stott | 294/82 AH X |
| 4,153,262 | 5/1979 | Diamond et al. | 28/756 X |

*Primary Examiner*—Johnny D. Cherry
*Attorney, Agent, or Firm*—Harry G. Thibault

[57] ABSTRACT

A single point vehicle lifting attachment having a lift frame resting on the operator's compartment of the vehicle and flexible cables connected between the lift frame and the vehicle frame.

5 Claims, 3 Drawing Figures

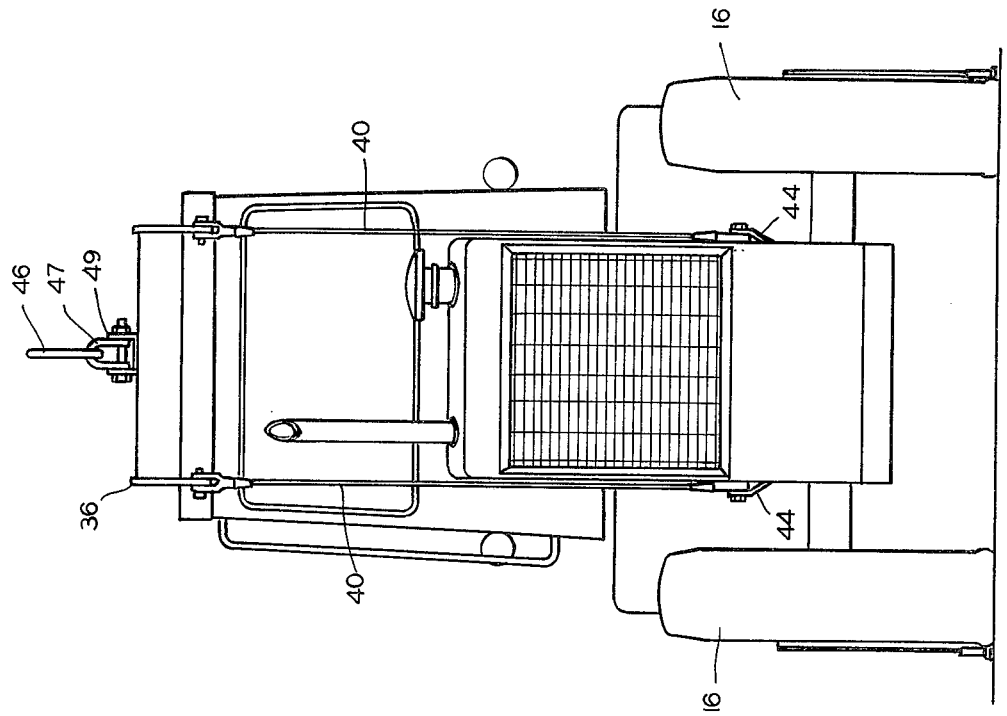
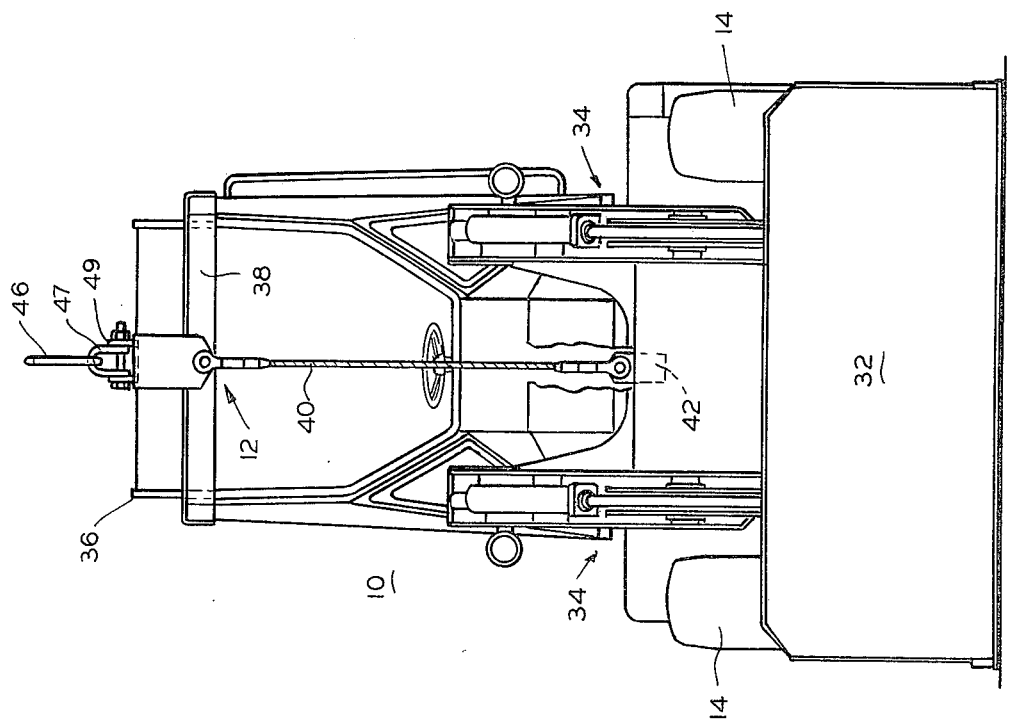

VEHICLE LIFTING ATTACHMENT

This application is a continuation of application Ser. No. 075,859, filed Sept. 17, 1979, now abandoned.

BACKGROUND OF THE INVENTION

1. Field of the Invention

This invention relates to a single point vehicle lifting attachment which enables a vehicle to be lifted by a crane and moved between locations such as between a dock and a ship or barge and back again.

2. Description of the Prior Art

U.S. Pat. No. 2,818,296 Brennan and Toscano shows a sling type apparatus for lifting automotive vehicles. Cradles are inserted manually beneath the front and rear pairs of wheels and then slings or flexible cables are secured between overhead rings and the outer ends of the cradles to provide for lifting the vehicle by a hoisting hook. After the lifting has been carried out the slings and cradles must be removed.

U.S. Pat. No. 2,915,534 Barenyi shows brackets or other attaching devices which are carried by or connected to the frame of an automobile. Slings are attached to such devices so that lifting can be carried out. After the handling has been completed the slings are detached and the attaching devices are removed from the frame or restored to their initial retracted condition on the frame.

U.S. Pat. No. 2,987,340 Mattera shows a spreader structure for use in a sling type device in order to adapt it to the lifting of one or more automobiles in a balanced configuration.

U.S. Pat. Nos. 3,239,237 Spencer, 3,863,973 Ross, and 3,964,776 Stott all show various attaching devices which are carried by the trailers of logging trucks so that the trailers can be lifted by a hook or other lifting apparatus and either deposited on or removed from the truck which pulls the trailer. All three of these attaching devices remain on the respective trailers during operation but in all three cases there is no significant superstructure on the trailer frame and consequently the attaching device can be secured on the trailer frame at a central location.

SUMMARY OF THE INVENTION

The present invention provides a single point lifting attachment for a vehicle having a frame and a superstructure on the frame which includes an operator's compartment. A lift frame rests on the operator's compartment and a lift ring is connected to the lift frame. At least three flexible cables are connected between the lift frame and the vehicle frame, and the entire lifting attachment remains on the vehicle during normal operation.

BRIEF DESCRIPTION OF THE DRAWINGS

FIG. 2 of the drawing is a front elevational view of the same vehicle; and

FIG. 3 is a rear elevational view of the same vehicle.

DESCRIPTION OF THE PREFERRED EMBODIMENT

Figure 1:
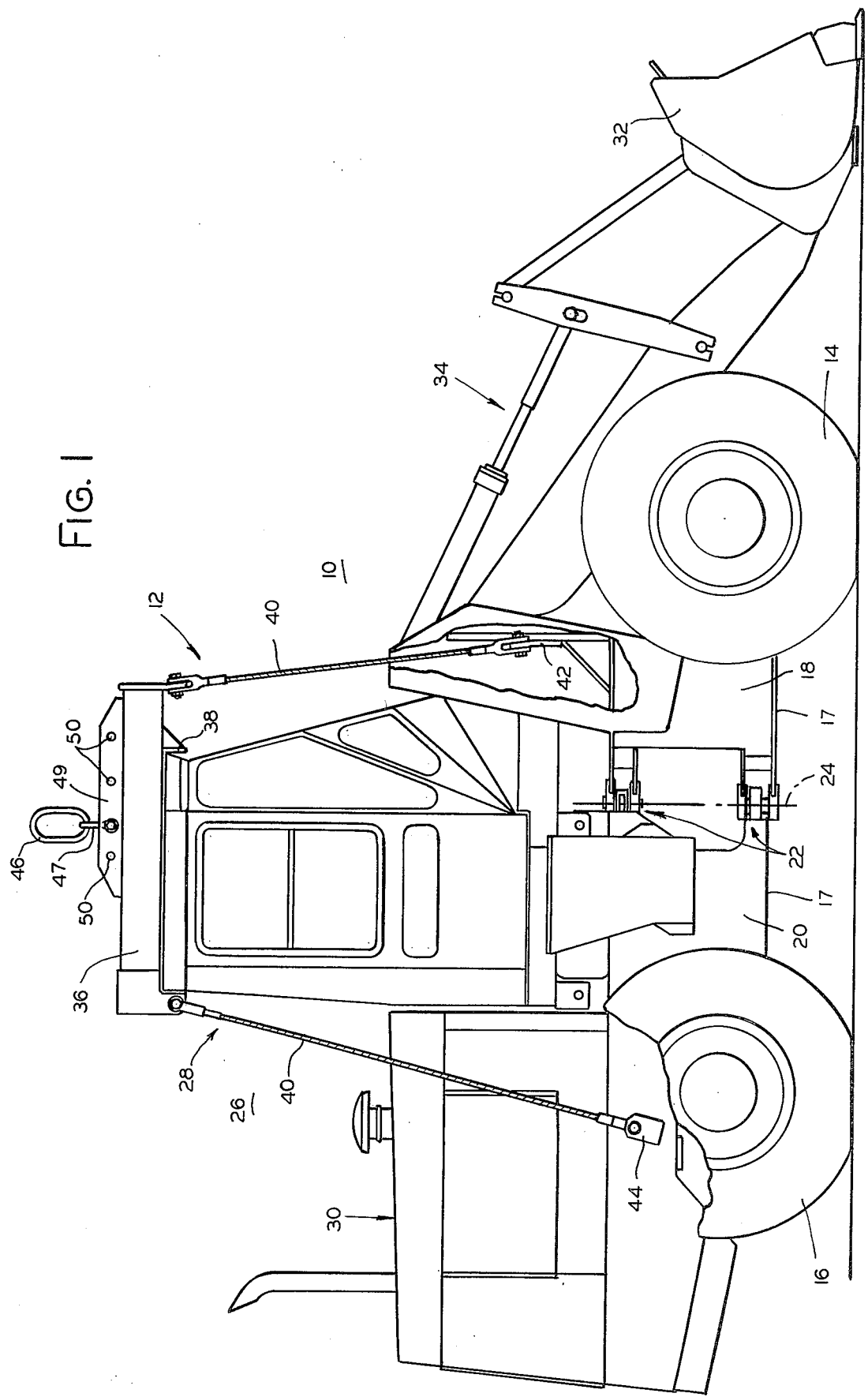
FIG. 1 of the drawing is a side elevational view (with portions broken away) of a wheel loader vehicle embodying this invention.

On the drawing the numeral 10 indicates generally a wheel loader vehicle embodying this invention while the numeral 12 designates the lifting attachment. The loader 10 includes front wheels 14 and rear wheels 16 which support a two-part frame 17. The vehicle frame 17 includes a front portion 18 and a rear portion 20 and the two are joined by a pivot connection 22 which permits one frame portion to pivot with respect to the other about the axis 24 for steering the vehicle. The rear wheels 16 are located on an axle which is mounted on rear frame portion 20 for limited pivotal movement about a longitudinal horizontal axis to accommodate the vehicle to irregularities in the terrain on which it operates.

The vehicle 10 includes a superstructure which is designated generally by the numeral 26. The superstructure includes an operator's compartment 28 and an engine compartment 30, both of which are mounted on rear frame portion 20. The operator's compartment 28 also serves as a roll-over protection structure. That is, it is designed and constructed to protect the operator from injury in the event that the vehicle should overturn.

At the front the vehicle 10 is equipped with a loader bucket 32 which is carried by a movable boom arm structure 34 which is used for maneuvering the bucket under remote control by the operator for filling the bucket with material to be handled and loading such material into a truck, hopper or other repository.

The lifting attachment 12 comprises a lift frame 36 which rests loosely on top of the operator's compartment 28. The lift frame 36 is provided with a downwardly extending flange structure 38 on all four sides to maintain the lift frame in position on top of the operator's compartment when the attachment is in use and also when it is not in use. Three flexible cables 40 connect the lift frame with the main frame of the vehicle, one of the cables 40 being connected between the front of the lift frame 36 and a bracket 42 which is welded or otherwise secured to front frame portion 18. As will be apparent from FIG. 2, the flexible cable 40 is centered in front of the operator's compartment.

The other two cables 40 are connected between the rear corners of the lift frame 36 and opposite sides of the rear frame portion 20, being secured to brackets 44 which are secured respectively on opposite sides of the rear frame portion. See FIG. 3. The cables 40 are slack when the vehicle is not being lifted. When it is being lifted they are, of course, taut and the bottom surface of the lift frame 36 under such conditions is a small amount above the top surface of the operator's compartment, such as about 1-1½ inches. Lifting is accomplished by hook on a suitable crane or other hoisting device which engages the lifting eye formed by the oblong ring 46 which is secured to the top of lift frame 36.

The ring 46 is secured by a link 47 to a bracket 49 which is in turn secured to the top surface of lift frame 36. The bracket 49 is located generally of the lift frame from side to side and extends longitudinally. The bracket 49 is provided with a plurality of openings 50 to provide for adjustment of the ring 46 and the lifting eye which it forms longitudinally on the lift frame in order to get the lifting eye approximately over the center of mass of the vehicle.

It will be appreciated that it is not ordinarily possible to secure a ring similar to ring 46 directly to the top of the operator's compartment to provide a lifting eye. If compartment 28 were merely a cab for protecting the operator from the elements, it would not ordinarily have sufficient strength to permit the vehicle to be lifted in such a manner. Many such vehicles, such as the wheel loader which is shown, are required to have roll-over protection structures and it is not ordinarily permissible to connect anything to such structures which may impair their strength or structural integrity and thereby diminish protection for the operator. The present invention provides a relatively low cost and simple attachment for lifting a vehicle does not impair the strength or integrity of the operator's compartment, and is not required to be attached and removed for each lifting operation. Having a single cable in front of the operator's compartment during operation has been found not to significantly impair the operator's visibility when he operates the vehicle.

This invention is particularly advantageous for some loader vehicles which must be moved frequently between a dock and a barge. After being lifted from the dock to the barge the loader unloads the contents of the barge by depositing it in containers or on a conveyor. After the barge has been unloaded the loader is then lifted from the barge back to the dock, utilizing the lift attachment of this invention.

As illustrated, this invention is shown applied to an articulated vehicle which has a pivot connection between the two portions of the main frame to provide for steering the vehicle. However, the invention is applicable also to a vehicle having a one piece main frame. If desired, more than three cables may be used for connecting the lift frame and main frame depending upon the configuration of the vehicle and visibility considerations.

It will be appreciated that the lifting eye 46 should be located approximately above the center of mass of the vehicle 10 in order to minimize undesirable stresses during a lifting operation, particularly lateral forces by the flange portion 38 of the lift frame on the top portion of the operator's compartment 28. As disclosed the flange portion 38 extends peripherally around the perimeter of the top of the operator's compartment, on all four sides, although the right side portion of the flange is shown broken away in FIG. 1 and the front portion is shown broken away in FIG. 2. The dimensions of the flange portion 38 are such as to permit small lateral movement by the lift frame including the flange portion both fore and aft and from side to side with respect to the top of the operator's compartment. The flange portion 38 extends downwardly from the lift frame enough to keep the lift frame in place on top of the operator's compartment even when the cables 40 are taut during lifting. The flexible cables referred to in the claims and elsewhere connecting the lift frame with the vehicle main frame preferably are made of wire rope but chains and other equivalent flexible sling members can be used.

While I have described and illustrated herein the best mode contemplated for carrying out my invention it will be appreciated that modifications may be made. It should be understood therefore that I intend to cover by the appended claims all such modifications which fall within the true spirit and scope of my invention.

I claim:

1. A lifting attachment for a vehicle having a frame and a superstructure on the frame including an operator's compartment, comprising a horizontally disposed multilateral lift frame resting on the operator's compartment during normal vehicle operation, a lifting eye connected to said lift frame and located approximately over the center of mass of the vehicle, and at least three flexible cables connected between said lift frame and the vehicle frame.

2. A lifting attachment for a vehicle having a two-part frame comprising front and rear portions with the two portions joined by a pivot connection, and a superstructure including an operator's compartment mounted on the rear frame portion, the lifting attachment comprising a lift frame resting on the operator's compartment during normal vehicle operation, a lifting eye connected to said lift frame and located approximately over the center of mass of the vehicle, a first flexible cable connected between said lift frame and the front frame portion, and two flexible cables connected between said lift frame and the rear frame portion.

3. A lifting attachment according to claim 1 or claim 2 in which the said lift frame is provided with a downwardly extending flange portion which restricts horizontal movement of the frame with respect to the operator's compartment.

4. A lifting attachment as in claim 1 or claim 2 in which said lifting eye is adjustable longitudinally of the vehicle.

5. A rubber tired loader vehicle comprising a two-part frame having a front portion and a rear portion, said two portions joined by a pivot steer connection, a loader bucket mounted on a boom arm on said front frame portion, a superstructure including an operator's compartment mounted on said rear frame portion, said operator's compartment having a flat top of predetermined dimensions, a horizontally disposed lift frame of greater peripheral dimensions than the top of the operator's compartment resting on said compartment top during normal vehicle operation, a flange portion on said lift frame extending downwardly from the periphery of the frame for limiting horizontal movement of said lift frame relative to said compartment top, a lifting eye connected to said lift frame, a first flexible cable connected between the front of said lift frame and said front frame portion, two flexible cables connected between the rear part of said lift frame and said rear frame portion, the said lift frame with the lifting eye and the flexible cables forming a lifting attachment which remains attached to the vehicle during normal operation, the said flexible cables having sufficient slack to permit pivoting of the two said frame parts relative to each other for steering, said lifting eye providing a single point lifting location for said vehicle, and means for adjusting the location of said lifting eye to position it approximately over the center of mass of the vehicle.

* * * * *